United States Patent [19]
Takeuchi

[11] Patent Number: 5,390,294
[45] Date of Patent: Feb. 14, 1995

[54] GRAPHIC PROCESSING SYSTEM FOR AUTOMATICALLY RECONSTRUCTING DIMENSIONAL AND GEOMETRIC CONSTRAINTS OF GRAPHICS

[75] Inventor: Kazuhiro Takeuchi, Shizuoka, Japan

[73] Assignee: Fujitsu Limited, Japan

[21] Appl. No.: 124,405

[22] Filed: Sep. 17, 1993

[30] Foreign Application Priority Data

Sep. 18, 1992 [JP] Japan .................. 4-249033

[51] Int. Cl.$^6$ .......................................... G06F 15/60
[52] U.S. Cl. .................. 395/155; 395/140; 395/141
[58] Field of Search ............ 395/155, 140, 141, 142, 395/161; 364/512

[56] References Cited

U.S. PATENT DOCUMENTS

| | | | |
|---|---|---|---|
| 5,070,534 | 12/1991 | Lascelles et al. | 395/155 |
| 5,123,087 | 6/1992 | Newell et al. | 395/155 |
| 5,197,120 | 3/1993 | Saxton et al. | 395/141 X |
| 5,231,697 | 7/1993 | Yamada | 395/141 X |
| 5,251,290 | 10/1993 | Pabon | 395/140 X |
| 5,261,033 | 11/1993 | Oka | 395/142 |
| 5,265,197 | 11/1993 | Kondo | 395/141 X |

FOREIGN PATENT DOCUMENTS

0492901A2 12/1991 European Pat. Off. .
4271475 9/1992 Japan .

Primary Examiner—Heather R. Herndon
Assistant Examiner—Cliff Nguyen Vo
Attorney, Agent, or Firm—Greer, Burns & Crain, Ltd.

[57] ABSTRACT

A graphic processing system having a graphic element managing table storing the graphic information of graphic elements and a dimension-geometry constraint managing table storing the dimensional and geometric constraints for graphic elements. The system includes a dimension-geometric constraint succession judging table referred to for judging whether or not the dimensional and geometric constraints of a graphic are to be succeeded. Thereby, the system automatically determines whether the constraint information in the dimension-geometry constraint managing table can be succeeded as they are or must be deleted when editing is further applied to a graphic which has been already formed. The automatic determination is achieved by referring to the dimension-geometry constraint succession judging table which updates the constraint information without manual operation by the user.

12 Claims, 27 Drawing Sheets

Fig. 3A

| EDITING / DIMENSIONAL CONSTRAINT | FILLET | CHAMFER | TRIMMING | DELETION |
|---|---|---|---|---|
| HORIZONTAL | ○ | ○ | ○ | × |
| VERTICAL | ○ | ○ | ○ | × |
| PARALLEL | ○ | ○ | ○ | × |
| ORTHOGONAL | ○ | ○ | ○ | × |
| TANGENT | △ | △ | △ | × |
| SAME LENGTH | × | × | × | × |
| SAME ANGLE | ○ | ○ | ○ | × |
| SAME HORIZONTAL COORDINATE | △ | △ | △ | × |
| SAME VERTICAL COORDINATE | △ | △ | △ | × |
| SAME CONCENTRIC COORDINATE | ○ | ○ | ○ | × |
| CONNECTION | △ | △ | △ | × |
| REFERENCE POINT | ○ | ○ | ○ | × |

Fig. 3B

| DIMENSIONAL CONSTRAINT / EDITING | STRAIGHT LINE DIMENSION | | | | ANGLE DIMENSION | | CIRCULAR ARC DIMENSION |
|---|---|---|---|---|---|---|---|
| | HORIZONTAL/VERTICAL | | PARALLEL | NORMAL | | | |
| | STRAIGHT LINE | POINT AND POINT | STRAIGHT LINE LENGTH | STRAIGHT LINE AND POINT | LINE SEGMENT TO LINE SEGMENT | CIRCULAR ARC | RADIUS/ DIAMETER |
| FILLET | X | △ | X | △ | ○ | X | ○ |
| CHAMFER | X | △ | X | △ | ○ | — | — |
| TRIMMING | X | △ | X | △ | ○ | X | ○ |
| DELETION | X | X | X | X | X | X | X |

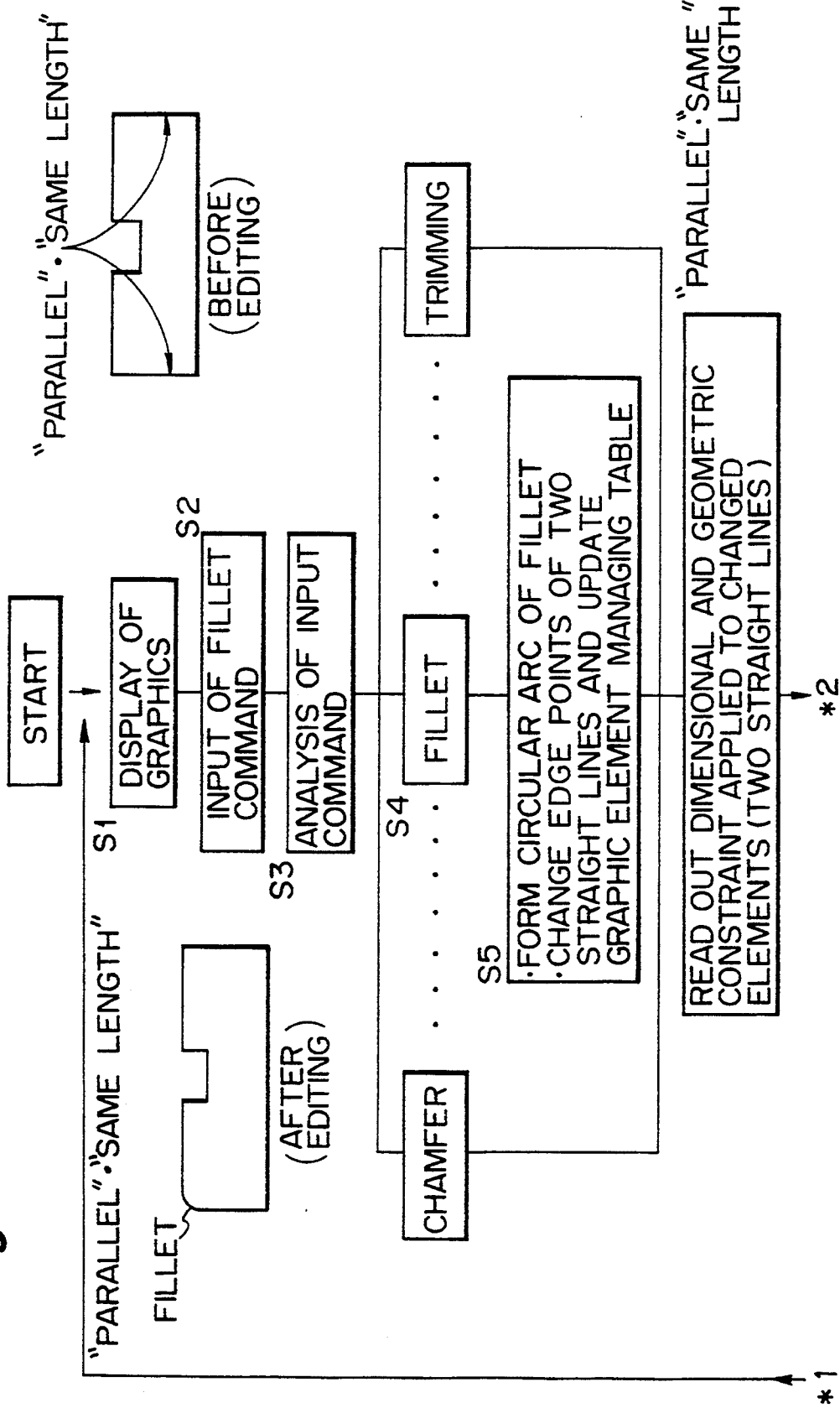

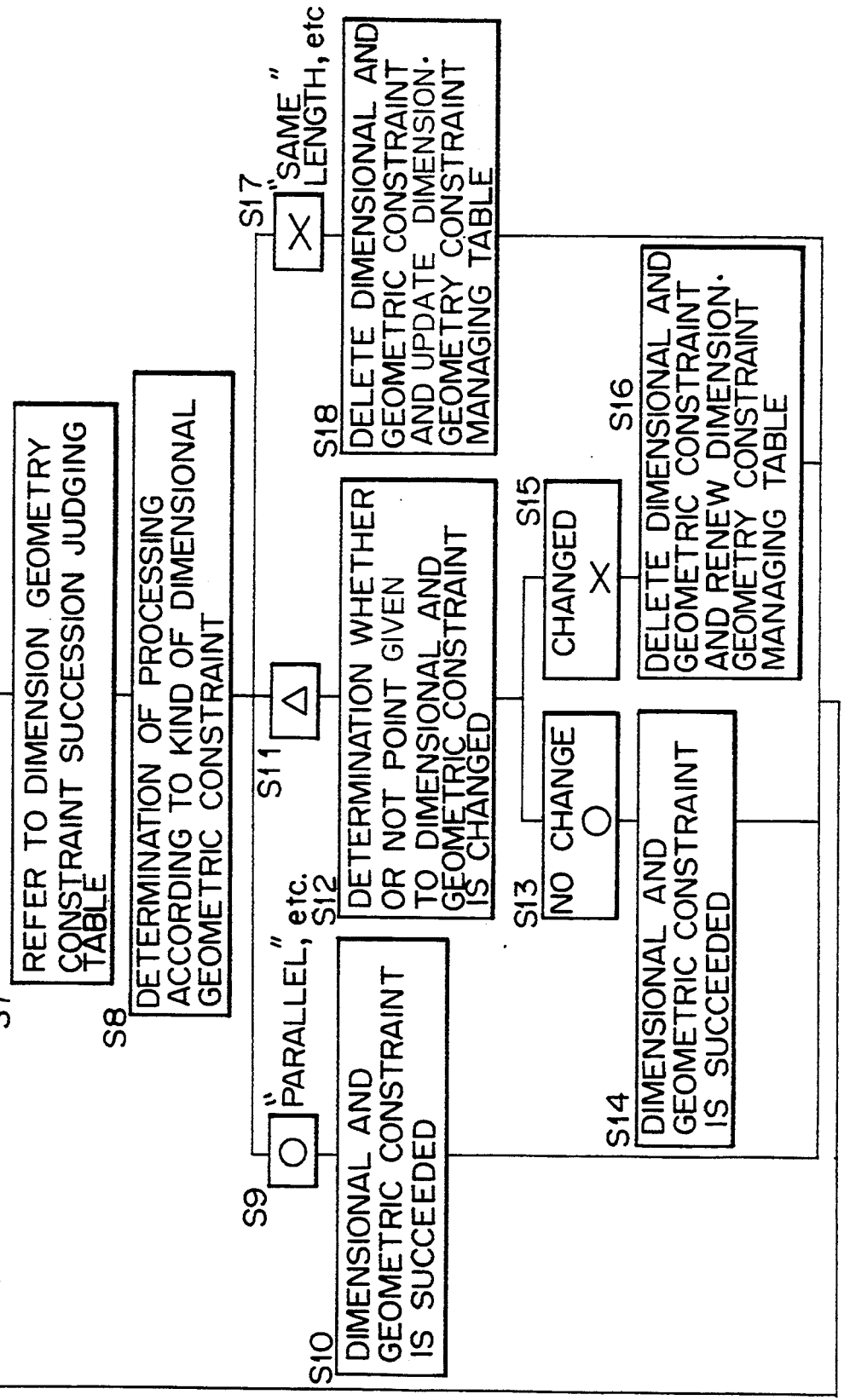

Fig. 9

GRAPHIC ELEMENT MANAGING TABLE 9 (BEFORE EDITING)

| ELEMENT ID | TYPE | GRAPHIC INFORMATION |
|---|---|---|
| 1 | STRAIGHT LINE | START POINT (0, 0) END POINT (0, 10) |
| 2 | STRAIGHT LINE | START POINT (0, 10) END POINT (10, 10) |
| 3 | STRAIGHT LINE | START POINT (10, 10) END POINT (10, 8) |
| 4 | STRAIGHT LINE | START POINT (10, 8) END POINT (15, 8) |
| 5 | STRAIGHT LINE | START POINT (15, 8) END POINT (15, 10) |
| 6 | STRAIGHT LINE | START POINT (15, 10) END POINT (25, 10) |
| 7 | STRAIGHT LINE | START POINT (25, 10) END POINT (25, 0) |
| 8 | STRAIGHT LINE | START POINT (25, 0) END POINT (0, 0) |

GRAPHIC ELEMENT MANAGING TABLE 9 (AFTER EDITING)

| ELEMENT ID | TYPE | GRAPHIC INFORMATION |
|---|---|---|
| 1 | STRAIGHT LINE | START POINT (0, 0) END POINT (0, 8) — CHANGED |
| 2 | STRAIGHT LINE | START POINT (2, 10) END POINT (10, 10) — CHANGED |
| 3 | STRAIGHT LINE | START POINT (10, 10) END POINT (10, 8) |
| 4 | STRAIGHT LINE | START POINT (10, 8) END POINT (15, 8) |
| 5 | STRAIGHT LINE | START POINT (15, 8) END POINT (15, 10) |
| 6 | STRAIGHT LINE | START POINT (15, 10) END POINT (25, 10) |
| 7 | STRAIGHT LINE | START POINT (25, 10) END POINT (25, 0) |
| 8 | STRAIGHT LINE | START POINT (25, 0) END POINT (0, 0) |
| 9 | CIRCULAR ARC | CENTER (2, 8) RADIUS 2 START ANGLE 90° INCREMENT ANGLE 90° — ADDED |

Fig. 10

| DIMENSION·GEOMETRY CONSTRAINT MANAGING TABLE 8 (BEFORE EDITING) | | |
|---|---|---|
| DIMENSIONAL AND GEOMETRIC CONSTRAINT ID | TYPE | CORRESPONDING ELEMENT INFORMATION |
| 1 | PARALLEL | ①, ⑦ |
| 2 | SAME LENGTH | ①, ⑦ |

| DIMENSION·GEOMETRY CONSTRAINT MANAGING TABLE 8 (AFTER EDITING) | | |
|---|---|---|
| DIMENSIONAL AND GEOMETRIC CONSTRAINT ID | TYPE | CORRESPONDING ELEMENT INFORMATION |
| 1 | PARALLEL | ①, ⑦ |

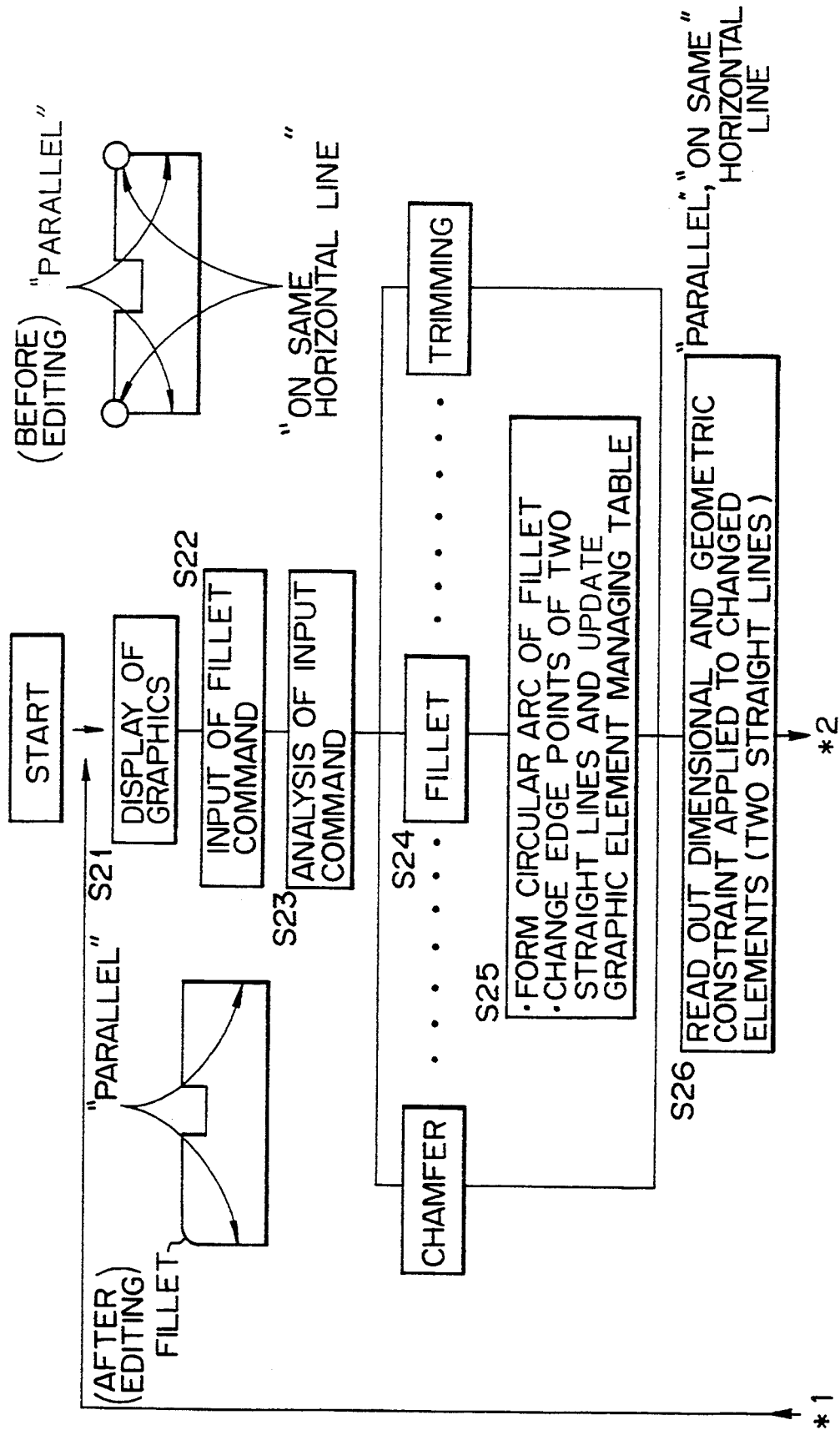

Fig. 13

GRAPHIC ELEMENT MANAGING TABLE 9 (BEFORE EDITING)

| ELEMENT ID | TYPE | GRAPHIC INFORMATION |
|---|---|---|
| 1 | STRAIGHT LINE | START POINT (0, 0) END POINT (0,10) |
| 2 | STRAIGHT LINE | START POINT (0,10) END POINT (10,10) |
| 3 | STRAIGHT LINE | START POINT (10,10) END POINT (10, 8) |
| 4 | STRAIGHT LINE | START POINT (10, 8) END POINT (15, 8) |
| 5 | STRAIGHT LINE | START POINT (15, 8) END POINT (15,10) |
| 6 | STRAIGHT LINE | START POINT (15,10) END POINT (25,10) |
| 7 | STRAIGHT LINE | START POINT (25,10) END POINT (25, 0) |
| 8 | STRAIGHT LINE | START POINT (25, 0) END POINT (0, 0) |

GRAPHIC ELEMENT MANAGING TABLE 9 (AFTER EDITING)

| ELEMENT ID | TYPE | GRAPHIC INFORMATION |
|---|---|---|
| 1 | STRAIGHT LINE | START POINT (0, 0) END POINT (0, 8) ← CHANGED |
| 2 | STRAIGHT LINE | START POINT (2,10) END POINT (10,10) |
| 3 | STRAIGHT LINE | START POINT (10,10) END POINT (10, 8) |
| 4 | STRAIGHT LINE | START POINT (10, 8) END POINT (15, 8) |
| 5 | STRAIGHT LINE | START POINT (15, 8) END POINT (15,10) |
| 6 | STRAIGHT LINE | START POINT (15,10) END POINT (25,10) |
| 7 | STRAIGHT LINE | START POINT (25,10) END POINT (25, 0) |
| 8 | STRAIGHT LINE | START POINT (25, 0) END POINT (0, 0) |
| 9 ← ADDED | CIRCULAR ARC | CENTER (2,8) RADIUS 2 START ANGLE 90° INCREMENT ANGLE 90° |

Fig. 14

DIMENSION·GEOMETRY CONSTRAINT MANAGING TABLE 8 (BEFORE EDITING)

| DIMENSIONAL AND GEOMETRIC CONSTRAINT ID | TYPE | CORRESPONDING ELEMENT INFORMATION |
|---|---|---|
| 1 | PARALLEL | ①, ⑦ |
| 2 | ON SAME HORIZONTAL LINE | END POINT OF ①, START POINT OF ⑦ |

DIMENSION·GEOMETRY CONSTRAINT MANAGING TABLE 8 (AFTER EDITING)

| DIMENSIONAL AND GEOMETRIC CONSTRAINT ID | TYPE | CORRESPONDING ELEMENT INFORMATION |
|---|---|---|
| 1 | PARALLEL | ①, ⑦ |

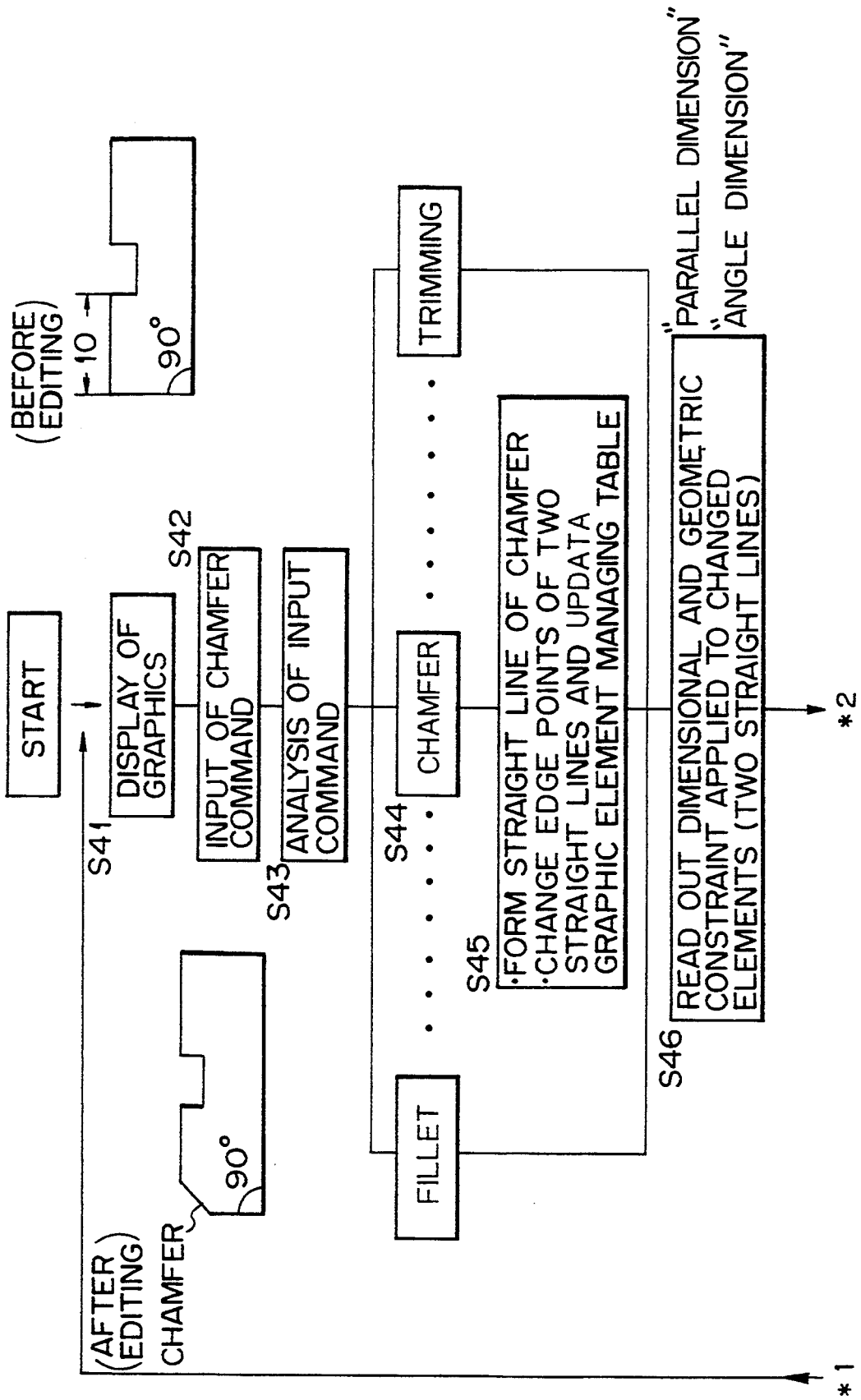

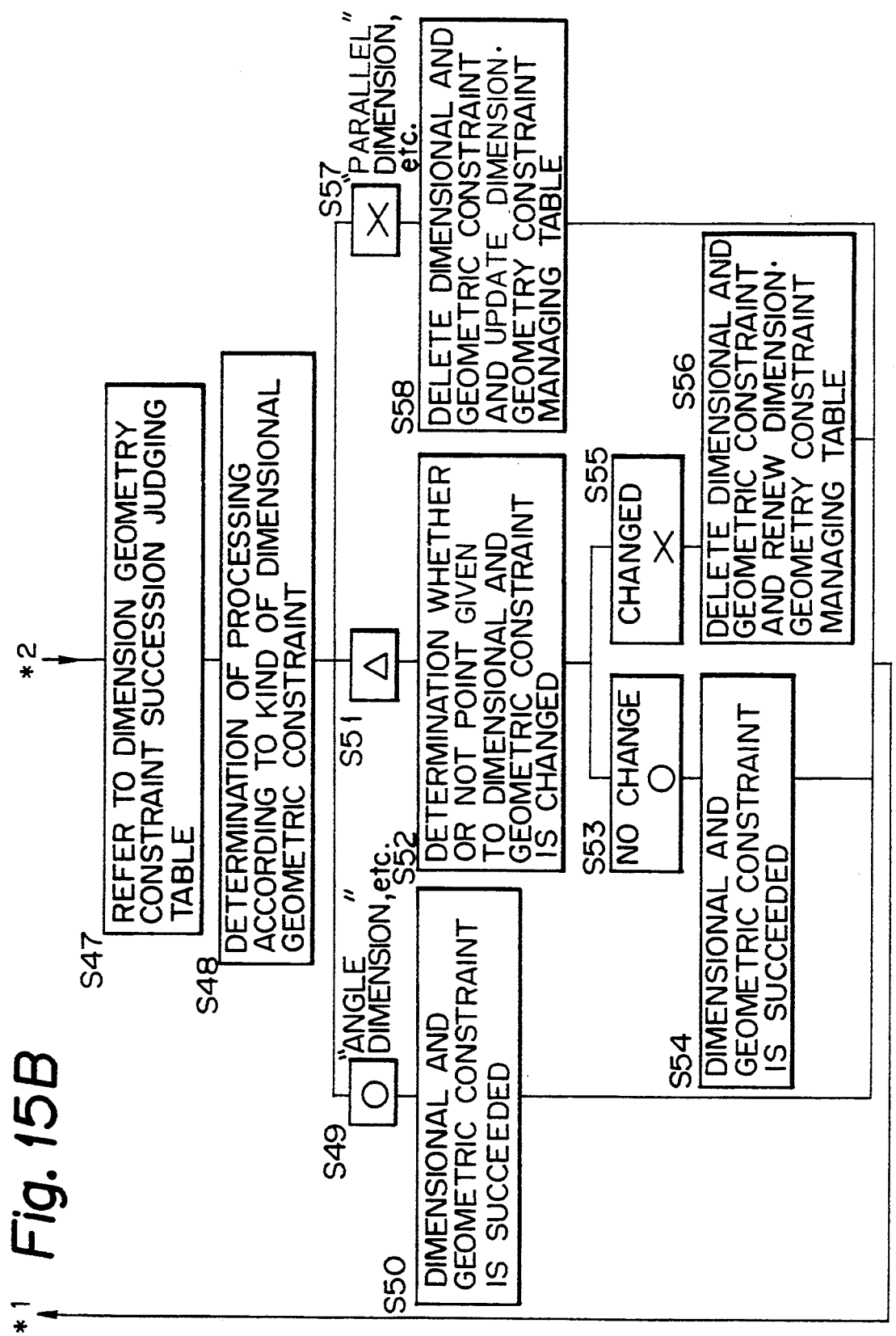

Fig. 17

GRAPHIC ELEMENT MANAGING TABLE 9 (BEFORE EDITING)

| ELEMENT ID | TYPE | GRAPHIC INFORMATION | |
|---|---|---|---|
| 1 | STRAIGHT LINE | START POINT (0,0) | END POINT (0,10) |
| 2 | STRAIGHT LINE | START POINT (0,10) | END POINT (10,10) |
| 3 | STRAIGHT LINE | START POINT (10,10) | END POINT (10,8) |
| 4 | STRAIGHT LINE | START POINT (10,8) | END POINT (15,8) |
| 5 | STRAIGHT LINE | START POINT (15,8) | END POINT (15,10) |
| 6 | STRAIGHT LINE | START POINT (15,10) | END POINT (25,10) |
| 7 | STRAIGHT LINE | START POINT (25,10) | END POINT (25,0) |
| 8 | STRAIGHT LINE | START POINT (25,0) | END POINT (0,0) |

GRAPHIC ELEMENT MANAGING TABLE 9 (AFTER EDITING)

| ELEMENT ID | TYPE | GRAPHIC INFORMATION | |
|---|---|---|---|
| 1 | STRAIGHT LINE | START POINT (0,0) | END POINT (0,8) |
| 2 | STRAIGHT LINE | START POINT (2,10) | END POINT (10,10) |
| 3 | STRAIGHT LINE | START POINT (10,10) | END POINT (10,8) |
| 4 | STRAIGHT LINE | START POINT (10,8) | END POINT (15,8) |
| 5 | STRAIGHT LINE | START POINT (15,8) | END POINT (15,10) |
| 6 | STRAIGHT LINE | START POINT (15,10) | END POINT (25,10) |
| 7 | STRAIGHT LINE | START POINT (25,10) | END POINT (25,0) |
| 8 | STRAIGHT LINE | START POINT (25,0) | END POINT (0,0) |
| 9 | STRAIGHT LINE | START POINT (0,8) | END POINT (2,10) |

CHANGED

ADDED

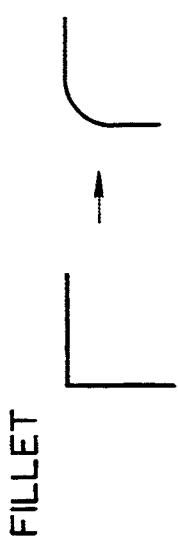
FILLET
Fig. 19A
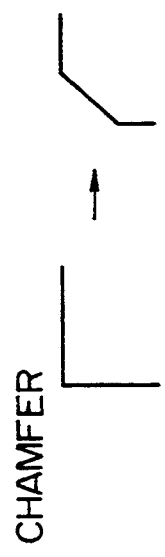
CHAMFER
Fig. 19B
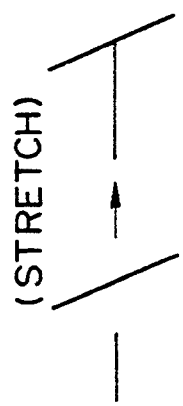
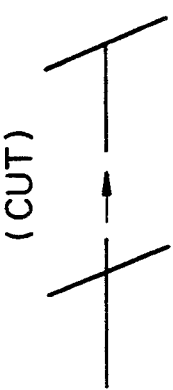
TRIMMING
Fig. 19C Fig. 20A  HORIZONTAL

Fig. 20B  VERTICAL

Fig. 20C  PARALLEL

Fig. 20D  ORTHOGONAL

Fig. 20E  TANGENT

Fig. 20F  SAME LENGTH

Fig. 20G  SAME ANGLE

Fig. 20H  SAME VERTICAL COORDINATE

Fig. 20I  SAME HORIZONTAL COORDINATE

Fig. 20J  SAME CONCENTRIC COORDINATE

Fig. 20K  CONNECTION

GRAPHIC PROCESSING SYSTEM FOR AUTOMATICALLY RECONSTRUCTING DIMENSIONAL AND GEOMETRIC CONSTRAINTS OF GRAPHICS

BACKGROUND OF THE INVENTION

1. Field of the Invention

The present invention relates to a graphic processing system for automatically reconstructing the dimensional and geometric constraints of graphics.

In recent years, in computer aided design, increased use has been made of graphic processing systems with a parametric (variational) function. With this function, by defining the geometric constraints (horizontal, vertical, parallel, and other geometric constraints) and dimensions with respect to a graphic, when the value of a dimension is changed, the graphic is changed accordingly. Thanks to this function, it becomes possible to easily makes changes in design. Note that a "constraint" means the establishment of a condition arbitrarily determining the shape of a graphic to the system.

2. Description of the Related Art

Systems realizing the above-described parametric function have already been supplied for commercial use. Accordingly, the technique for realizing a parametric function per se does not cause any trouble in current systems.

However, when a user further edits a formed graphic, that is, a graphic for which the dimensional and geometric constraints have already been defined, the following trouble occurs.

The user often wants to further edit a formed graphic, that is, a graphic for which the dimensional and geometric constraints have been already defined. Here, "edit" means, as will be mentioned in detail later, further application of a fillet, chamfer, trimming, and so on to a part of the formed graphic. When such editing is carried out on the display of, for example, a CAD system using a pointing device, the contents of the dimensional and geometric constraints of the related graphic already defined in a table in the system no longer match with the contents of the dimensional and geometric constraints newly defined by the related graphic after editing. This being the case, if the parametric function is activated referring to the above-mentioned table, the correct desired graphic will not be formed.

In conventional systems, when further performing the above-described editing on a formed graphic, use was made of the procedure of:

(a) holding the contents of the above-described table as they were or (b) completely deleting (erasing), among the data in the above-described table, the data of the dimensional and geometric constraints concerning the graphic for which the above-described editing was carried out.

However, in a system adopting the procedure of the above-described (a), no longer matching data remains as it is in the table, and therefore when drawing the graphic by the parametric function after this, there is a possibility of a glaringly erroneous picture on the display. At this time, the user is forced to manually correct the data in the table causing the erroneous picture.

Accordingly, in a system adopting the procedure of the above-described (a), there are the problems that every time the above-described editing is carried out, the load on the user is large and the user is inconvenienced.

On the other hand, in a system adopting the procedure of the above-described (b), to re-activate the original parametric function, the user must newly reconstruct the data in the table concerning the edited graphic by manual operation.

Accordingly, in the system adopting the procedure of the above-described (b) as well, there are the problems that every time editing is carried out, the load on the user is large and the user is inconvenienced.

SUMMARY OF THE INVENTION

Therefore, in view of the above problems, an object of the present invention is to provide a system in which the dimensional and geometric constraints of a graphic for which the above-described editing was carried out are automatically reconstructed in the table without manual operation by the user, whereby the load on the user can be reduced.

To attain the above object, the present invention realizes a system which reconstructs the contents in an already existing dimension-geometry constraint managing table every time editing is carried out without manual operation by the user, that is, automatically, for activating the parametric function. A dimension-geometry constraint succession judging table is introduced into this system by the present invention. This judging table stores information which quickly enables the judgment of whether the data in the above-described dimension-geometry constraint managing table must be deleted due to the editing or can be maintained as they are when editing is further carried out with respect to a graphic after it is formed. Accordingly, by referring to this judging table, it becomes possible to automatically reconstruct the above-described dimension-geometry constraint managing table.

BRIEF DESCRIPTION OF THE DRAWINGS

The above object and features of the present invention will be more apparent from the following description of the preferred embodiments with reference to the accompanying drawings, wherein:

FIGS. 3A and 3B are views showing one example of a dimension-geometry constraint succession judging table constituting the characteristic feature of the present invention;

FIGS. 7A and 7B are flow charts showing the operation of the system according to the present invention after the editing shown in FIG. 6A is carried out;

FIG. 9 is a view showing the contents of a graphic element managing table before the first example of editing is executed (left column) and the contents of the graphic element managing table after that editing is executed (right column);

FIG. 10 is a view showing the contents of a dimension-geometry constraint managing table before the first example of editing is executed (left column) and the contents of the dimension-geometry constraint managing table after that editing is executed (right column);

FIGS. 11A and 11B are flow charts showing the operation of the system according to the present invention after the editing shown in FIG. 6B is carried out;

FIG. 13 is a view showing the contents of a graphic element managing table before a second example of editing is executed (left column) and the contents of the graphic element managing table after that editing is executed (right column);

FIG. 14 is a view showing the contents of a dimension-geometry constraint managing table before the second example of editing is executed (left column) and the contents of the dimension-geometry constraint managing table after that editing is executed (right column);

FIGS. 15A and 15B are flow charts showing the operation of the system according to the present invention after the editing shown in FIG. 6C is carried out;

FIG. 17 is a view showing the contents of a graphic element managing table before the third example of editing is executed (left column) and the contents of the graphic element managing table after that editing is executed (right column);

FIGS. 19A, 19B, and 19C are views diagrammatically showing three examples of editing;

FIGS. 20A to 20K are views diagrammatically showing 11 examples of a geometric constraint.

DESCRIPTION OF THE PREFERRED EMBODIMENTS

Before describing the embodiments of the present invention, the related art and the problems therein will be first described with reference to the related figures.

Figure 1A:
FIGS. 1A, 1B, and 1C are views for explaining a parametric function and an editing function.
Figure 1B:
Figure 1C:
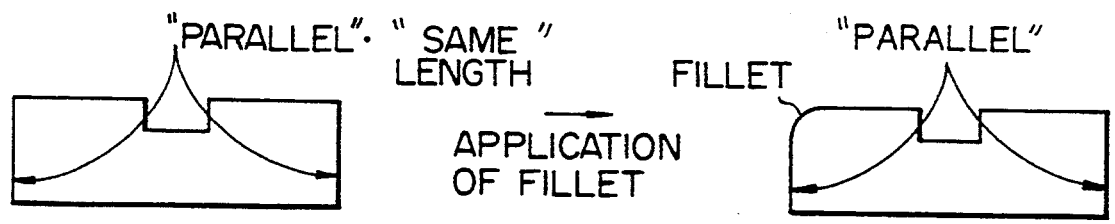

FIGS. 1A, 1B, and 1C are views for explaining the parametric function and editing function.

The left side of FIG. 1A shows an example of rectangle as the graphic which was formed. In addition to the graphic elements showing, for example, that the width thereof is 20 and the height is 30 (the unit is for example mm), as illustrated, geometric constraints such as "HORIZONTAL" and "VERTICAL" are given.

When the user wants to change this graphic (left side) to change it from the height 30 to the height 15, in a system having a parametric function, he may use the above-described geometric constraints "HORIZONTAL" and "VERTICAL" to quickly form the desired graphic indicated on the right side of FIG. 1A just by redesignating it to "CHANGE HEIGHT TO 15". That is, when "CHANGE HEIGHT TO 15" is designated, the change of design is automatically completed.

FIG. 1B shows another example of a graphic for explaining the parametric function. In addition to the graphic elements (height 30, width 25, angle between two ling segments is 60°) indicated on the left side of the same diagram, the geometric constraints "HORIZONTAL" and "VERTICAL" are given.

When the user wants to change such a graphic (left side) to change it from the height 30 to the height 45, in a system having a parametric function, he may use the above-described geometric constraints "HORIZONTAL" and "VERTICAL" to quickly form the desired graphic indicated on the right side of FIG. 1B merely by redesignating it to "CHANGE HEIGHT TO 45". That is, when "CHANGE HEIGHT TO 45" is designated, the change of design is automatically completed.

The present invention relates to a case where editing is further applied to a graphic formed in a system provided with the parametric function as described above. FIG. 1C is a view for diagrammatically explaining the editing function thereof and shows an example of editing where a fillet is applied to a part of a certain graphic as indicated on the left side of the figure to change to the graphic having a fillet as indicated on the right side of the figure.

According to the example of this FIG. 1C, the geometric constraints "PARALLEL" and "SAME LENGTH" were applied to the original graphic. However, by the user having performed editing to give it a fillet, the constraint "SAME LENGTH" among the geometric constraints becomes invalid. This is because, after that fillet is applied, the lengths of the left side and right side of the related graphic clearly no longer are the same. That is, the constraint possessed by the graphic before the above-described editing is carried out (on left side of the figure) and the constraint possessed by the graphic after the editing indicated on the right side of the figure no longer match, so that the above-described problems were caused.

So as to solve these problems, according to the present invention, succession judgment conditions are preliminarily set in a dimension-geometry constraint succession judging table for the dimensional and geometric constraints fetched from the dimension-geometry constraint managing table corresponding to the editing of the graphic. The dimension-geometry constraint succession judging table is referred to. When the judgment is for succession, the contents of the table are retained as they are, while when the judgment is for deletion, the related data is deleted from the dimension-geometry constraint managing table. In this way, the judgment of succession and deletion of the geometric constraints is automatically carried out. By this, the load on the user in reconstructing the constraints is reduced.

Figure 2A:
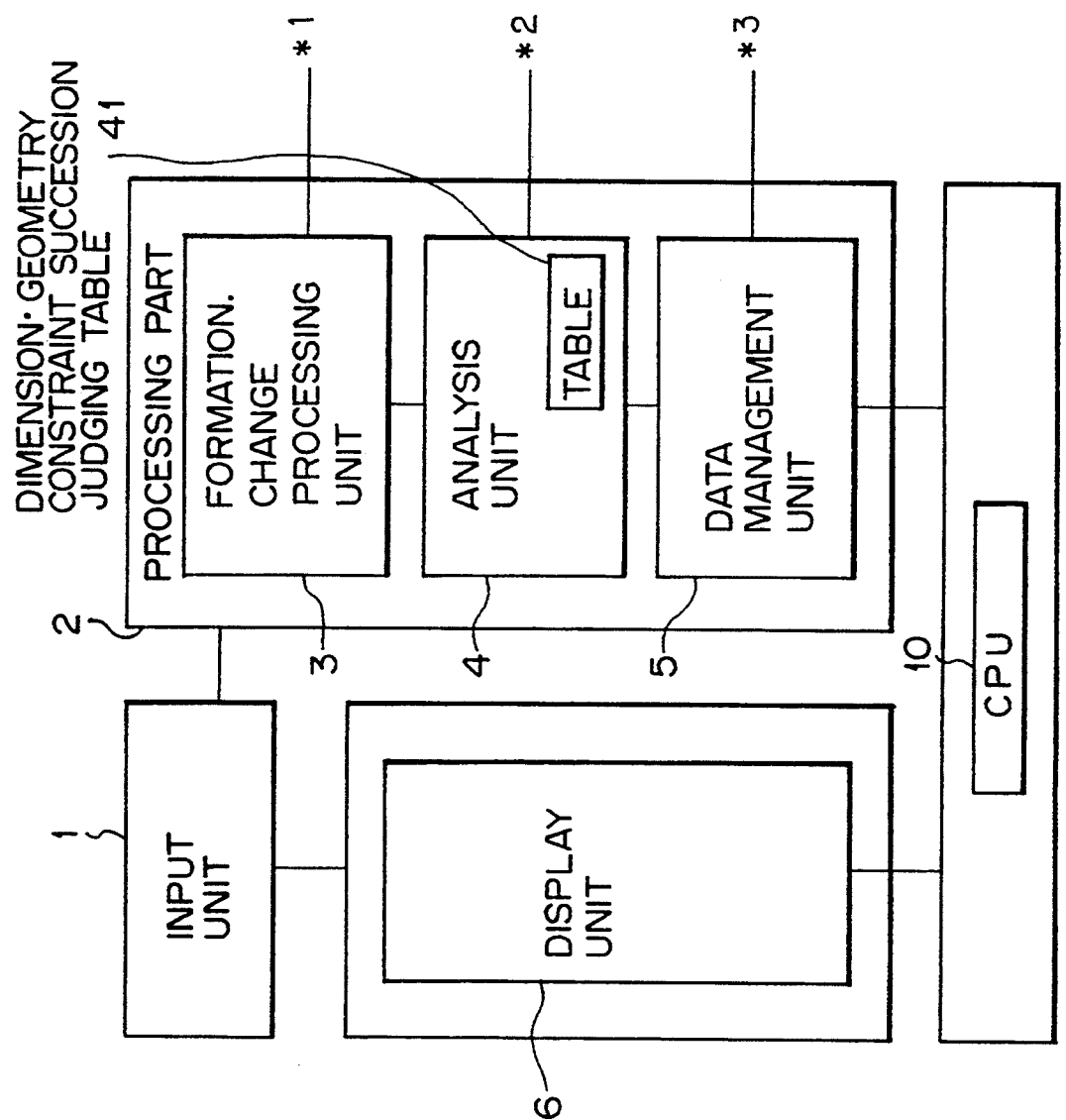
FIGS. 2A and 2B are structural views of a system according to the present invention.
Figure 2B:
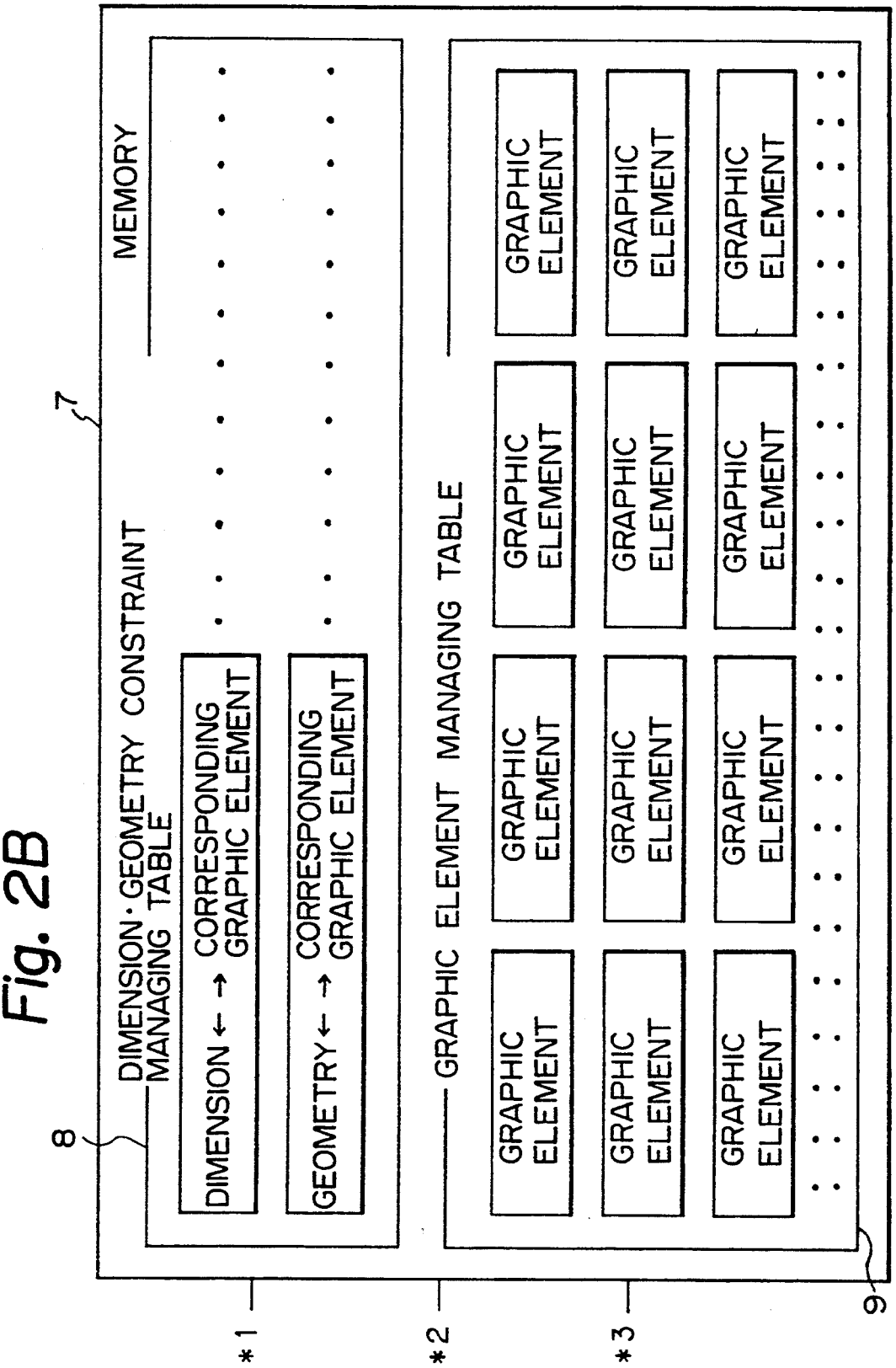

FIGS. 2A and 2B are structural views of a system according to the present invention. In the figures, the dimension-geometry constraint managing table 41 is a table preliminarily registering whether or not the dimensional and geometric constraints of the graphic are to be succeeded.

The graphic element managing table 9 is a table storing the graphic information in correspondence with element identification (ID) of the graphic elements constituting the graphics.

The dimension-geometry constraint managing table 8 is a table for storing the dimensional and geometric constraints for the graphic elements stored in the graphic element managing table 9.

As shown in FIGS. 2A and 2B, according to the present invention, in correspondence with the application of editing to a certain graphic and the change of the graphic elements of that graphic accompanying the same, the corresponding graphic elements in the graphic element managing table 9 are updated. At the same time, the dimensional and geometric constraints applied to the changed graphic elements are read out from the above-described dimension-geometry constraint managing table 8. The dimension-geometry constraint succession judging table 41 is referred to for these read out dimensional and geometric constraints. When the judgment is for succession, they are retained as they are, while when the judgment is for deletion, they are deleted from the dimension-geometry constraint managing table 8.

At this time, the succession and deletion of the dimensional constraints (straight line dimension, angle dimension, etc.) and geometric constraints (horizontal, vertical, parallel, etc.) are preliminarily registered in the dimension-geometry constraint succession judging table 41 in correspondence with editing names (fillet, chamfer, etc.)

Also, the graphic information (start point coordinate, end point coordinate, etc.) are stored in the graphic element managing table 9 in correspondence with the element ID of the graphic elements constituting the graphic.

Also, in correspondence with the dimensional constraint ID's and geometric constraint ID's, the contents thereof are stored in the dimension-geometry constraint managing table 8.

Accordingly, the succession judgment conditions are preliminarily set in the dimension-geometry constraint succession judging table 41. The dimension-geometry constraint succession judging table 41 is referred to for the dimensional and geometric constraints read out from the dimension-geometry constraint managing table 8 in accordance with the editing of the graphic. When the judgment is for succession, the data is retained as it is, while when the judgment is for deletion, it is deleted from the dimension-geometry constraint managing table 8. By this, the succession and deletion of the dimensional and geometric constraints are automatically carried out.

In FIGS. 2A and 2B, an input unit 1 receives as its inputs an editing command (fillet command, chamfer command, trimming command, deletion command, etc.) and various types of data.

A processing part 2 performs various types of processing and is constituted here by a formation and change processing unit 3, an analysis unit 4, a data management unit 5, etc.

The formation and change processing unit 3 performs various types of formation and change processings such as the formation of the graphic elements, change of the geometric constraints, automatic formation of the geometric constraints, automatic change of the geometric constraints, formation of the dimensional constraints, automatic change of the dimensional constraints, etc.

The analysis unit 4 analyzes which editing and editing-constraint reconstructing processing is to be carried out by analyzing the input editing command (fillet command, chamfer command, trimming command, deletion command, etc.)

The dimension-geometry constraint succession judging table 41 is a table preliminarily registering whether or not the dimensional constraints and geometric constraints of the graphic are to be succeeded. This dimension-geometry constraint succession judging table 41 is the table referred to when the succession or deletion of the edited graphic elements is determined by the analysis unit 4.

The data management unit 5 stores the graphic elements, dimensional and geometric constraints, etc. in the graphic element managing table 9 and updates, changes, and deletes the same.

The display unit 6 is a display for displaying the formed graphics etc.

A memory 7 stores the various types of data and information. Here, it stores the dimension-geometry constraint managing table 8 and graphic elements management table 9. It is constituted by a memory or an external storage unit.

The dimension-geometry constraint managing table 8 is a table for storing the dimensional and geometric constraint information for the graphic elements stored in the graphic element managing table 9. For example, as indicated in the left column of FIG. 10 mentioned later, in correspondence with the dimensional and geometric constraint ID, it registers the type of constraint (parallel, same length, etc.) and corresponding element information, that is, information for the graphic elements given these constraints (for example, graphic elements "1", "7", etc.)

The graphic element managing table 9 is a table for storing the graphic information in correspondence with the element ID's for the graphic elements constituting a graphic. For example, as indicated in the left column of FIG. 9 mentioned later, it stores the type of element (straight line, circular arc, etc.) and graphic information (start point coordinate, end point coordinate, etc.) in correspondence with the element ID's.

A central processing unit (CPU) 10 commands various types of processing according to the preliminarily determined program.

FIGS. 3A and 3B are views showing one example of a dimension-geometry constraint succession judging table 41 constituting the characteristic feature of the present invention.

FIG. 3A shows the geometric constraints in correspondence with the editing names.

Here, "o" means that the dimension-geometry constraint managing table 8 is to be succeeded unconditionally.

"Δ" means that the data of table 8 is to be deleted when the changed edge point serves as a reference of the geometric constraint, while the data of table 8 is to be succeeded in other cases.

"x" means that the data of table 8 is to be deleted.

For example, when a fillet is applied, in the case of a HORIZONTAL, VERTICAL, PARALLEL, ORTHOGONAL, SAME ANGLE, or other constraint, the data of table 8 is succeeded as is. For a SAME LENGTH constraint, the data is not succeeded, but is deleted. The constraints are similarly succeeded or deleted for a chamfer or trimming type of editing as illustrated. On the other hand, in the case of deletion type editing, all constraints are deleted.

FIG. 3B shows the dimensional constraints in correspondence with the types of the editing.

Here, "o" means that the data of table 8 is to be succeeded unconditionally.

"Δ" means that the data of table 8 is to be deleted when the changed edge point serves as a reference of the dimensional constraint, while the data of table 8 is to be succeeded in other cases.

"x" means that the data of table 8 is to be deleted.

"—" means no function. For example, an editing for a "chamfer" cannot exist for a circular arc.

For example, when a fillet is applied, the data for the dimensional constraints HORIZONTAL/VERTICAL STRAIGHT LINE, PARALLEL STRAIGHT LINE, and CIRCULAR ARC are not succeeded in the table 8, but are deleted. The dimensional constraint ANGLE DIMENSION.LINE SEGMENT TO LINE SEGMENT is succeeded. The other constraints are deleted or succeeded as illustrated.

Figure 4A:
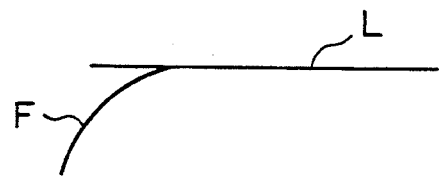
FIGS. 4A to 4F are views for explaining the principle of judgment with respect to geometric constraints.

FIGS. 4A to 4F are views for explaining the principle of the judgment with respect to the geometric constraints. FIG. 4A shows a case of editing to give a fillet F to the line segment L given a geometric constraint "HORIZONTAL". In this case, even if editing is applied to give a fillet F, the geometric constraint "HORIZONTAL" already given to that line segment L is not changed. That geometric constraint is succeeded as is. As a result, in the table shown in FIG. 3A, the relationship of "FILLET" vs "HORIZONTAL" become "o" as illustrated.

Figure 4B:
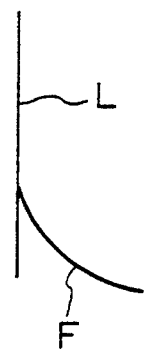

The same as the above also applies to the case where editing to give a fillet F is applied to the line segment L to which the geometric constraint "VERTICAL" is given as shown in FIG. 4B.

Figure 4C:
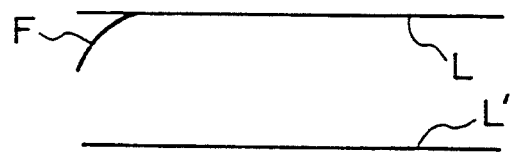

The same as the above also applies to the case where editing to give a fillet F is applied to either one or both of two line segments L and L' given the geometric constraint "PARALLEL" as shown in FIG. 4C.

Figure 4D:
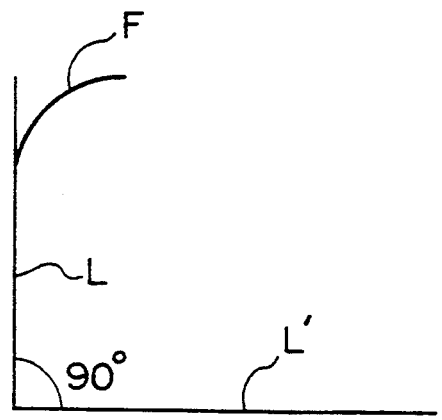

The same as the above also applies to the case where editing to give a fillet F is applied to either one or both of two line segments L and L' given the geometric constraint "ORTHOGONAL" as shown in FIG. 4D.

Figure 4E:
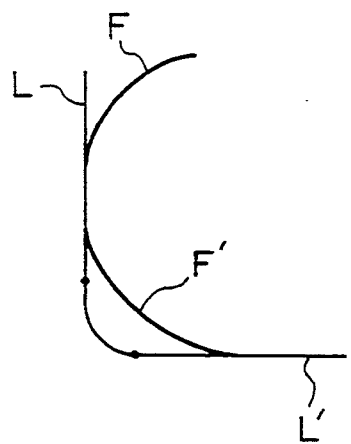

FIG. 4E shows a case where editing to give a fillet F or F' is applied to the line segments L and L' given the geometric constraint "TANGENT". In this case, even if the editing to give a fillet F is applied, the geometric constraint "TANGENT" which has been already applied to the line segments L and L' is not changed, but that geometric constraint is succeeded as it is. As a result, in the table shown in FIG. 3A, the relationship of "FILLET" vs "TANGENT" must become "o". However, when assuming a case where editing to give a fillet F' is applied in FIG. 4E, in this case, the geometric constraint "TANGENT" which has been already given to the line segments L and L' no longer exists and must be deleted from table 8. As a result, in the table shown in FIG. 3A, the relationship of "FILLET" vs "TANGENT" must become "x".

In the end, in the case of FIG. 4E, both of the cases of "o" and "x" stand. Thus, the relationship of "FILLET" vs "TANGENT" in FIG. 3A becomes A.

Figure 4F:
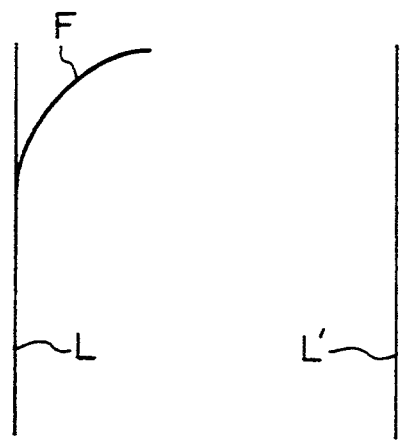

In FIG. 4F, where editing to give a fillet F is applied to one of the line segments L and L' given the geometric constraint "SAME LENGTH", the geometric constraint "SAME LENGTH" no longer stands between the two line segments L and L' as a result of this editing. Accordingly, that geometric constraint must be deleted from table 8. As a result, the relationship of "FILLET" vs "SAME LENGTH" becomes "x" in the table shown in FIG. 3A.

The judgment of "o", "Δ", or "x" is given for the other geometric constraints in FIG. 3A as well.

Figure 5A:
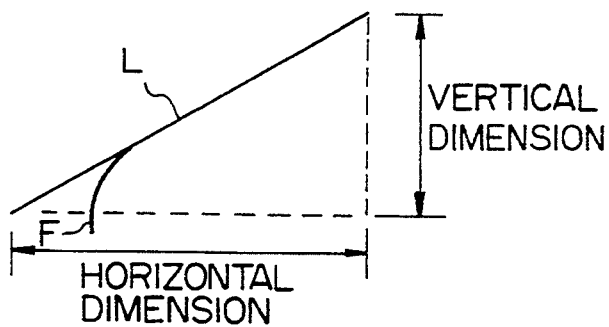
FIGS. 5A to 5D are views for explaining the principle of the judgment with respect to geometric constraints.

FIGS. 5A to 5D are views for explaining the principle of judgment with respect to the dimensional constraints. In FIG. 5A, if editing to give a fillet F is applied to a certain line segment L, both of the horizontal dimensional constraint and vertical dimensional constraint thereof not longer stand. Accordingly, the geometric constraints must be deleted from table 8. As a result, in the table shown in FIG. 3B, the relationship of "FILLET" vs "STRAIGHT LINE DIMENSION.-HORIZONTAL/VERTICAL.STRAIGHT LINE" becomes "x".

Figure 5B:
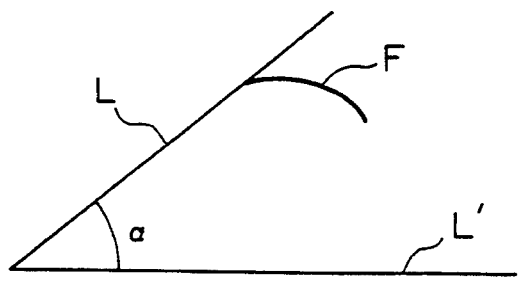

As shown in FIG. 5B, where an angle dimensional constraint (angle $\alpha$) has been given to certain line segments L and L', if the editing to give a fillet F is applied to L, that dimensional constraint is not changed by that editing. As a result, in the table shown in FIG. 3B, a relationship of "FILLET" vs "ANGLE DIMENSION.LINE SEGMENT TO LINE SEGMENT" becomes "o".

Figure 5C:
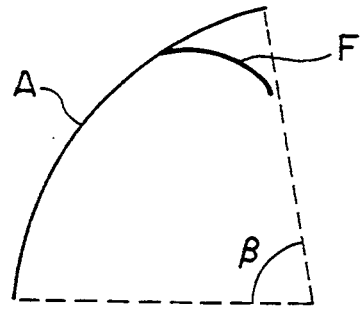

As shown in FIG. 5C, where the angle dimensional constraint of the angle $\beta$ has been given to a certain circular arc A, if editing to give a fillet F is applied to A, that geometric constraint no longer stands. As a result, in the table shown in FIG. 3B, a relationship of "FILLET" vs "ANGLE DIMENSION.CIRCULAR ARC" becomes "x".

Figure 5D:
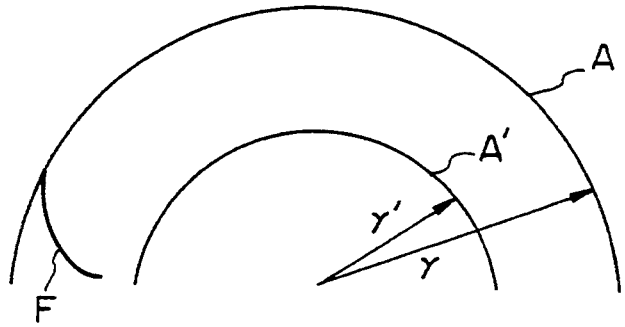

As shown in FIG. 5D, where the dimensional constraint (r, r') is given to the radius dimensions of certain circular arcs A and A' (same also for diameter dimensions), when assuming that editing to give a fillet F is applied to A, that dimensional constraint is not constrained by that editing. As a result, in the table shown in FIG. 3B, a relationship of "FILLET" vs "CIRCULAR ARC DIMENSION.RADIUS/DIAMETER" becomes "o".

Figure 6A:
FIGS. 6A, 6B, and 6C are views showing a concrete example of editing.
Figure 6B:
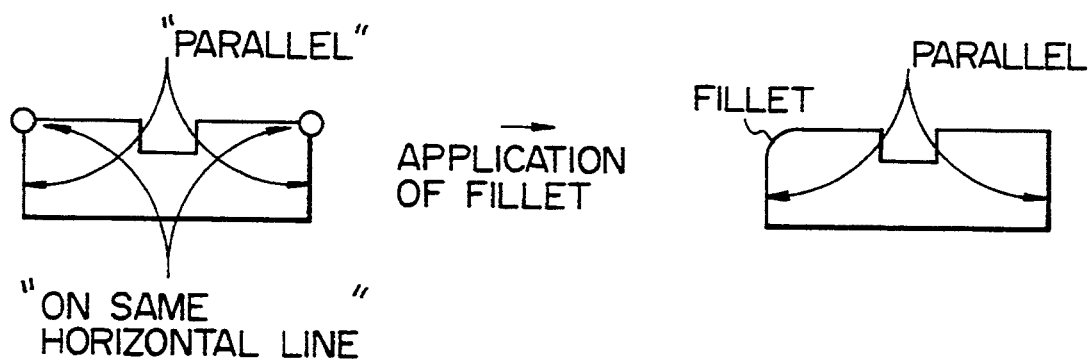
Figure 6C:

FIGS. 6A, 6B, and 6C are views showing concrete examples of editing.

FIG. 6A shows an example of applying a fillet (mentioned later using FIGS. 7A and 7B and FIGS. 8, 9, and 10).

The left column of FIG. 6A shows a state before the fillet is applied. In this state, "PARALLEL" and "SAME LENGTH" are given as the geometric constraints.

The right column of FIG. 6A shows a state after the fillet is applied. In this state, only "PARALLEL" exists as the geometric constraint ("SAME LENGTH" is deleted).

FIG. 6B shows an example of applying a fillet (mentioned later using FIGS. 11A and 11B and FIGS. 12, 13, and 14).

The left column of FIG. 6B shows a state before the fillet is applied. In this state, "PARALLEL" and "ON SAME HORIZONTAL LINE" are given as the geometric constraints.

The right column of FIG. 6B shows a state after the fillet is applied. In this state, only "PARALLEL" exists as the geometric constraint ("ON SAME HORIZONTAL LINE" is deleted).

FIG. 6C shows an example of applying a chamfer (mentioned later using FIGS. 15A and 15B and FIGS. 16, 17, and 18).

The left column of FIG. 6C shows a state before the chamfer is applied. In this state, "ANGLE (90°)" and "DIMENSION (10)" are given as the geometric constraints.

The right column of FIG. 6C shows a state after the chamfer is applied. In this state, only "ANGLE (90°)" exists as the geometric constraint ("DIMENSION (10)" is deleted).

This will be explained below.

Figure 8:
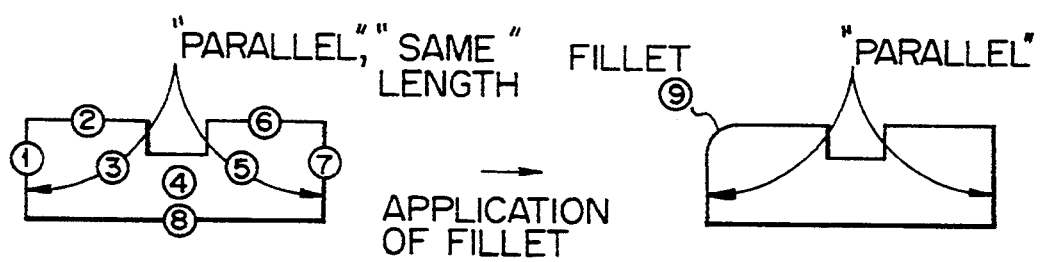
FIG. 8 is a view diagrammatically showing a first example of editing.

FIGS. 7A and 7B are flow charts showing the operation of the system according to the present invention after the editing shown in FIG. 6A is carried out; FIG. 8 is a view diagrammatically showing the first example of editing; FIG. 9 is a view showing the contents of a graphic element managing table before a first example of editing is executed (left column) and the contents of the graphic element managing table after that editing is executed (right column); and FIG. 10 is a view showing the contents of a dimension-geometry constraint managing table before the first example of editing is executed (left column) and the contents of the dimension-geometry constraint managing table after that editing is executed (right column).

In FIG. 7A, the graphic is displayed at step S1. This results in a display like the graphic indicated as before the editing on the right side. More specifically, the graphic is displayed on the display unit 6 based on the element types and graphic information from the element ID=1 to element ID=8 read out from the graphic element managing table 9 (before editing) in the left column of FIG. 9. At the same time, the constraint types "PARALLEL" and "SAME LENGTH" and corresponding element information "<1>, <7>" and "<1>, <7>" of the dimensional and geometric constraints ID=1 and ID=2 are read out from the dimension-geometry constraint managing table (before the editing) 8 of the left column of FIG. 10 and displayed as shown in the left column of FIG. 8 ("PARALLEL" and "SAME LENGTH" are displayed for a concave graphic).

At step S2, the user inputs the fillet command.

At step S3, the analysis unit 4 analyzes the type of command. Here, it is analyzed as a fillet command, so the routine passes S4 and proceeds to S5.

At step S5, since the command was found to be a fillet command at S3 and S4, the circular arc of the fillet is formed, the edge points of the two straight lines are changed, and the contents of the graphic element managing table 9 are updated. This is performed by the analysis unit 4.

This forms the circular arc of a fillet shown by <9> as the element ID=9 as shown in the graphic of the left column of FIG. 8. For example, as shown by the element ID=9 in the graphic element managing table 9 indicated in right column of FIG. 9, the circular arc of the fillet is formed based on the designated centers (2, 8), radius 2, start angle 90°, and increased angle 90°. Further, the edge points of the two straight lines are changed. Here, the end point (0, 10) of the element ID=1 in the graphic element managing table 9 indicated in the right column of FIG. 9 is changed to (0, 8) and the start point (0, 10) of the element ID=2 is changed to (2, 10). By this, the graphic element managing table (before editing) indicated in the left column of FIG. 9 is updated to the graphic element managing table (after editing) 9 indicated in the right column of FIG. 9 corresponding to the application of the fillet.

At step S6, the dimensional and geometric constraints applied to the changed elements (here, two straight lines <1> and <2>, i.e., the elements ID=1 and ID=2), are read out. Namely, from the dimension-geometry constraint managing table (before editing) 8 indicated in the left column of FIG. 10, the constraint type "PARALLEL" and corresponding element information "<1> and <7>" are read out as the dimensional and geometric constraint ID=1 and the constraint type "SAME LENGTH" and corresponding element information <1> and <7> are read out as the dimensional and geometric constraint ID=2.

At step S7 of FIG. 7B, the dimension-geometry constraint succession judging table 41 is referred to. That is, the dimension-geometry constraint succession judging table 41 of FIGS. 3A and 3B is referred to.

At step S8, the processing is judged according to the type of the dimensional and geometric constraint. That is, a judgment of whether it is the table of FIG. 3A or the table of FIG. 3B is performed.

(1) For the dimensional and geometric constraints given a "o" (step S9) in the columns of fillet in the dimension-geometry constraint succession judging table 41 indicated in FIG. 3A and 3B, the dimensional and geometric constraints are succeeded at S10 and are retained as they are.

(2) For the dimensional and geometric constraints given a "Δ" (S11) in the columns of fillet in the dimension-geometry constraint succession judging table 41 indicated in FIG. 3A and 3B, it is judged at step S12 whether or not the point given those dimensional and geometric constraints was changed. When no change was carried out ("o", S13), those dimensional and geometric constraints are succeeded (S14), while when a change was carried out ("x", S15), those dimensional and geometric constraints are deleted (the contents of the dimension-geometry constraint managing table 8 are updated).

(3) For the dimensional and geometric constraints given an "x" (S17) in the columns of fillet in the dimension-geometry constraint succession judging table 41 indicated in FIG. 3A and 3B, those dimensional and geometric constraints are deleted (the contents of the dimension-geometry constraint managing table 8 are updated) at S18.

In the present example, the "o" of step S9 corresponds to "PARALLEL", which is succeeded as is at step S10. As the above-described (3), "x" of S17 corresponds to "SAME LENGTH", which is thus deleted at S18. By this, in the dimension-geometry constraint managing table (before editing) 8 indicated in the left column of FIG. 10, the "PARALLEL" among the dimensional and geometric constraints is succeeded and "SAME LENGTH" is deleted as indicated in the dimension-geometry constraint managing table (after editing) 8 shown in the right column of FIG. 10.

As above, in a state where a graphic is displayed on the display unit 6, by just the user inputting the fillet command and parameter, dimensional and geometric constraints which should be succeeded are retained as they are, and those which must not be succeeded are deleted. That is, as shown from the left column of FIG. 10 to the right column of FIG. 10, the dimension-geometry constraint managing table 8 is automatically updated. By this, even when editing is applied to the graphic, the dimensional and geometric constraints are automatically reconstructed without troublesome procedures by the user.

Figure 11B:
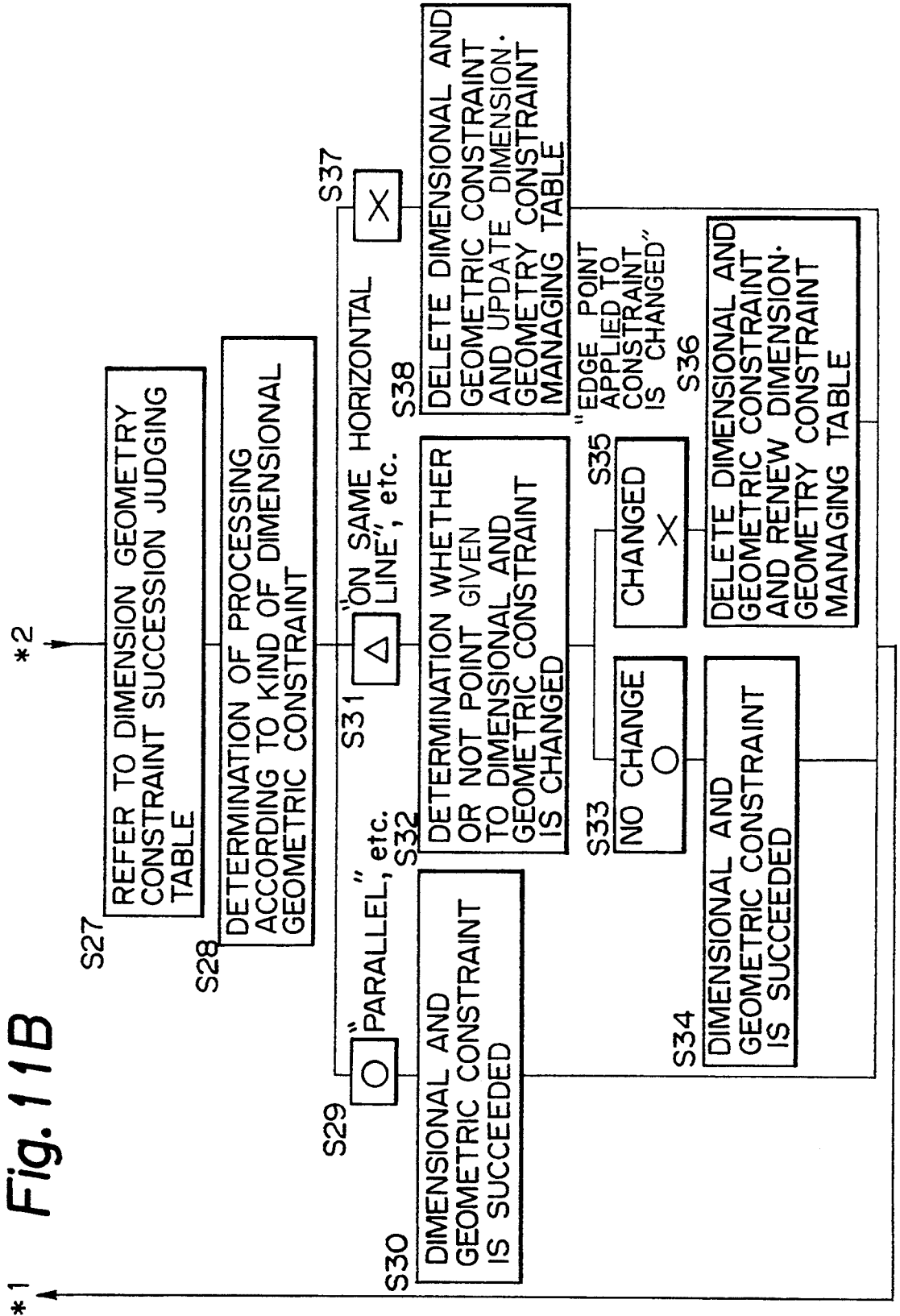
Figure 12:
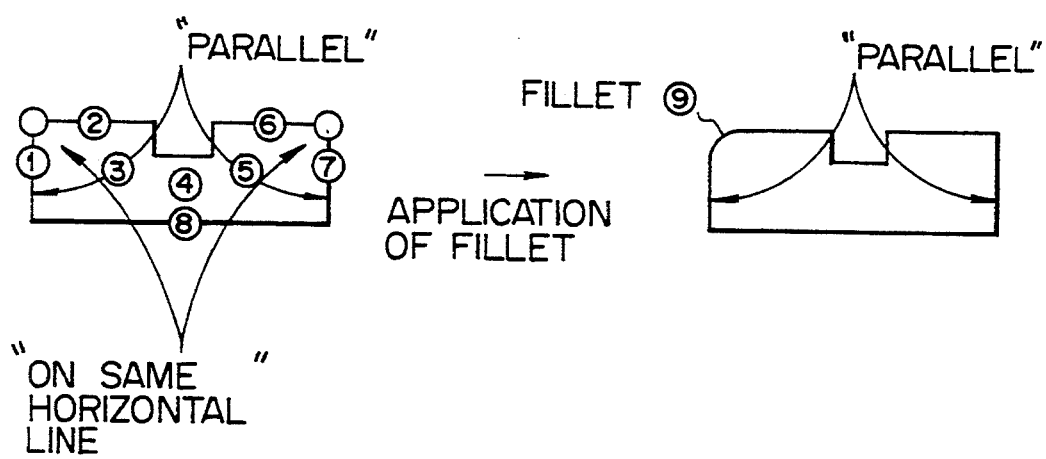
FIG. 12 is a view diagrammatically showing a second example of editing.

FIGS. 11A and 11B are flow charts showing the operation of the system according to the present invention after the editing shown in FIG. 6B is carried out; FIG. 12 is a view diagrammatically showing a second example of editing; FIG. 13 is a view showing the contents of a graphic element managing table before a second example of editing is executed (left column) and the contents of the graphic element managing table after that editing is executed (right column); and FIG. 14 is a view showing the contents of a dimension-geometry constraint managing table before the second example of editing is executed (left column) and the contents of the dimension-geometry constraint managing table after that editing is executed (right column).

In FIG. 11A, the graphic is displayed at step S21. This results in a display like the graphic explained as before the editing on the right side. More specifically, the graphic is displayed on the display unit 6 based on the element types and graphic information of the element ID=1 to element ID=8 read out from the graphic element managing table 9 (before editing) indicated in the left column of FIG. 13. At the same time, the constraint types "PARALLEL" and "SAME HORIZONTAL" and the corresponding element information "<1>, <7>" and "end point of <1> and start point of <7>" of the dimensional and geometric constraints ID=1 and ID=2 are read out from the dimension-geometry constraint managing table (before the editing) 8 indicated in the left column of FIG. 14 and displayed as shown in the left column of FIG. 12 ("PARALLEL" and "ON SAME HORIZONTAL LINE" are displayed for a concave graphic).

At step S22, the user inputs the fillet command.

At step S23, the analysis unit 4 analyzes the type of command. Here, it is analyzed as a fillet command, so the routine passes S24 and proceeds to S25.

At step S25, since the command was found to be a fillet command at S23 and S24, the circular arc of the fillet is formed, the edge points of the two straight lines are changed, and the contents of the graphic element managing table 9 are updated. This is performed by the analysis unit 4.

This forms the circular arc of the fillet shown by <9> as the element ID=9 as shown in the graphic of the right column of FIG. 7. For example, as shown by the element ID=9 in the graphic element managing table 9 indicated in the right column of FIG. 13, the circular arc of the fillet is formed based on the designated center (2, 8), radius 2, start angle 90° and increased angle 90°. Further, the edge points of the two straight lines are changed. Here, the end point (0, 10) of the element ID=1 in the graphic element managing table 9 indicated in the right column of FIG. 13 is changed to (0, 8) and the start point (0, 10) of the element ID=2 is changed to (2, 10). By this, along with the application of a fillet, the graphic element managing table (before editing) 9 indicated in the left column of FIG. 13 is updated to the graphic element managing table (after editing) 9 indicated in the right column of FIG. 13.

At step S26, the dimensional and geometric constraints applied to the changed elements (here, two straight lines <1> and <2>, i.e., the elements ID=1 and ID=2) are read out. Namely, from the dimension-geometry constraint managing table (before editing) 8 indicated in the left column of FIG. 14, the constraint type "PARALLEL" and corresponding element information "<1> and <7>" are read out as the dimensional and geometric constraint ID=1 and the element type "ON SAME HORIZONTAL LINE" and the corresponding element information, that is, the end point of <1> and start point <7>, are read out as the dimensional and geometric constraint ID=2.

At step S27 of FIG. 11B, the dimension-geometry constraint succession judging table 41 is referred to. That is, the dimension-geometry constraint succession judging table 41 of FIGS. 3A and 3B is referred to.

At step S28, the processing is judged according to the type of the dimensional and geometric constraint. That is, a judgment of whether it is the table of FIG. 3A or the table of FIG. 3B is performed.

(1) For the dimensional and geometric constraints given a "o" (step S29) in the columns of fillet in the dimension-geometry constraint succession judging table 41 indicated in FIG. 3A and 3B, the dimensional and geometric constraints are succeeded at S30 and are retained as they are.

(2) For the dimensional and geometric constraints given a "Δ" (S31) in the columns of fillet in the dimension-geometry constraint succession judging table 41 indicated in FIG. 3A and 3B, it is judged at step S32 whether or not the point given those dimensional and geometric constraints was changed. Where no change was carried out ("o", S33), those dimensional and geometric constraints are succeeded (S34), while when a change was carried out ("x", S35), those dimensional and geometric constraints are deleted (the contents of the dimension-geometry constraint managing table 8 are updated).

(3) For the dimensional and geometric constraints given an "x" (S37) in the columns of fillet in the dimension-geometry constraint succession judging table 41 indicated in FIG. 3A and 3B, those dimensional and geometric constraints are deleted (the contents of the dimension-geometry constraint managing table 8 are updated) at S38.

In the present example, "o" of step S29 corresponds to "PARALLEL", which is succeeded as is at step S30. As the above-described (3), "x" of S37 corresponds to "ON SAME HORIZONTAL LINE", which is deleted at S38. By this, in the dimension-geometry constraint managing table (before editing) 8 indicated in the left column of FIG. 14, the "PARALLEL" among the dimensional and geometric constraints is succeeded and "ON SAME HORIZONTAL LINE" is deleted as indicated in the dimension-geometry constraint managing table (after editing) 8 shown in the right column of FIG. 14.

As above, in a state where a graphic is displayed on the display unit 6, by just the user inputting the fillet command and parameter, dimensional and geometric constraints which should be succeeded are retained as they are, and those which must not be succeeded are deleted. That is, as shown from the left column of FIG. 14 to the right column of FIG. 14, the dimension-geometry constraint managing table 8 is automatically updated. By this, even when editing is applied to a graphic, the dimensional and geometric constraints are automatically reconstructed without troublesome procedures by the user.

Figure 16:
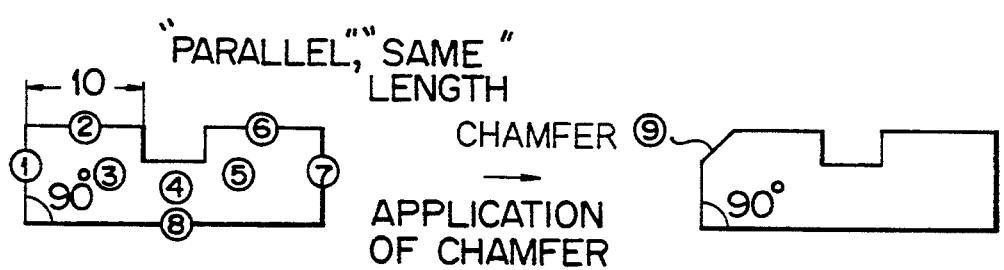
FIG. 16 is a view diagrammatically showing a third example of editing.
Figure 18:
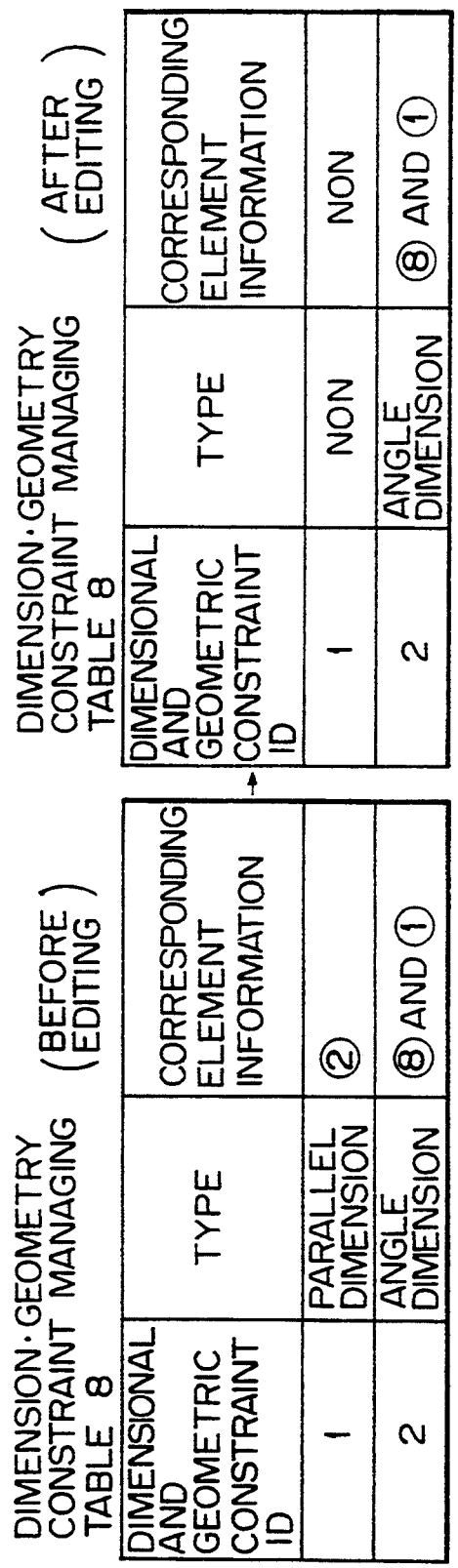
FIG. 18 is a view showing the contents of a dimension-geometry constraint managing table before the third example of editing is executed (left column) and the contents of the dimension-geometry constraint managing table after that editing is executed (right column)

FIGS. 15A and 15B are flow charts showing the operation of the system according to the present invention after the editing shown in FIG. 6C is carried out; FIG. 16 is a view diagrammatically showing a third example of editing; FIG. 17 is a view showing the contents of a graphic element managing table before the third example of editing is executed (left column) and the contents of the graphic element managing table after that editing is executed (right column); and FIG. 18 is a view showing the contents of a dimension-geometry constraint managing table before the third example of editing is executed (left column) and the contents of the dimension-geometry constraint managing table after that editing is executed (right column).

In FIG. 15A, the graphic is displayed at step S41. This results in a display like the graphic described as before the editing on the right side. More specifically, the graphic is displayed on the display unit 6 based on the element types and graphic information of the element ID=1 to element ID=8 read out from the graphic element managing table 9 (before editing) indicated in the left column of FIG. 17. At the same time, the constraint types "PARALLEL DIMENSION" and "ANGLE DIMENSION" and corresponding element information and "<8> and <1>" of the dimensional and geometric constraints ID=1 and ID=2 are read out from the dimension-geometry constraint managing table (before the editing) 8 indicated in the left column of FIG. 18, respectively, and displayed as shown in the left column of FIG. 16 ("PARALLEL DIMENSION (10)" and "ANGLE DIMENSION 90" are displayed for a concave graphic).

At step S42, the user inputs the chamfer command.

At step S43, the analysis unit 4 analyzes the type of command. Here, it is analyzed as a chamfer command, so the routine passes S44 and proceeds to S45.

At step S45, since the command was found to be a chamfer command at S43 and S44, the chamfer straight lines are formed, the edge points of the two straight lines are changed, and the contents of the graphic element managing table 9 are updated. This is performed by the analysis unit 4.

This forms the chamfer straight line shown by <9> as the element ID=9 as shown in the graphic of the right column of FIG. 16. For example, as shown by the element ID=9 in the graphic element managing table 9 indicated in the right column of FIG. 17, the designated straight line having the start point (0, 8) and end point (2, 10) is formed. Further, the edge points of the two straight lines are changed. Here, the end point (0, 10) of the element ID=1 in the graphic element managing table 9 indicated in the right column of FIG. 17 is changed to (0, 8) and the start point (0, 10) of the element ID=2 is changed to (2, 10). By this, the graphic element managing table (before editing) 9 indicated in the left column of FIG. 17 is updated to the graphic element managing table (after editing) 9 indicated in the right column of FIG. 17 corresponding to the application of a chamfer.

At step S46, the dimensional and geometric constraints applied to the changed elements (here, two straight lines <1> and <2>, i.e., the elements ID=1 and ID=2) are read out. Namely, from the dimension-geometry constraint managing table (before editing) 8 indicated in the left column of FIG. 9, the element type "PARALLEL DIMENSION" and corresponding element information "<2>" are read out as the dimensional and geometric constraint ID=1 and the constraint type "ANGLE DIMENSION" and corresponding element information <8> and <1> are read out as the dimensional and geometric constraint ID=2.

At step S47 of FIG. 15B, the dimension-geometry constraint succession judging table 41 is referred to. That is, the dimension-geometry constraint succession judging table 41 of FIGS. 3A and 3B is referred to.

At step S48, the processing is judged according to the type of the dimensional and geometric constraint. That is, a judgment of whether it is the table of FIG. 3A or the table of FIG. 3B is performed.

(1) For the dimensional and geometric constraints given a "o" (step S49) in the columns of chamfer in the dimension-geometry constraint succession judging table 41 indicated in FIG. 3A and 3B, the dimensional and geometric constraints are succeeded at S50 and are retained as they are.

(2) For the dimensional and geometric constraints given a "Δ" (S51) in the columns of chamfer in the dimension-geometry constraint succession judging table 41 indicated in FIG. 3A and 3B, it is judged at step S52 whether or not the point given those dimensional and geometric constraints was changed. Where no change was carried out ("o", S53), those dimensional and geometric constraints are succeeded (S54), while when a change was carried out ("x", S55), those dimensional and geometric constraints are deleted (the contents of the dimension-geometry constraint managing table 8 are updated).

(3) For the dimensional and geometric constraints given an "x" (S57) in the columns of chamfer in the dimension-geometry constraint succession judging table 41 indicated in FIG. 3A and 3B, those dimensional and geometric constraints are deleted (the contents of the dimension-geometry constraint managing table 8 are updated) at S58.

In the present example, "o" of step S49 corresponds to "ANGLE DIMENSION", which is succeeded as is at step S50. As the above-described (3), "x" of S57 corresponds to "PARALLEL DIMENSION", which is deleted at S58. By this, in the dimension-geometry constraint managing table (before editing) 8 indicated in the left column of FIG. 18, the "ANGLE DIMENSION" among the dimensional and geometric constraints is succeeded and "PARALLEL DIMENSION" is deleted as indicated in the dimension-geometry constraint managing table (after editing) 8 shown in the right column of FIG. 18.

As above, in a state where a graphic is displayed on the display unit 6, by just the user inputting the chamfer command and parameter, dimensional and geometric constraints which should be succeeded are retained as they are, and those which must not be succeeded are deleted. That is, as shown from the left column of FIG. 18 to the right column of FIG. 18, the dimension-geometry constraint managing table 8 is automatically updated. By this, even when editing is applied to a graphic, the dimensional and geometric constraints are automatically reconstructed without troublesome procedures by the user.

FIGS. 19A, 19B, and 19C are views diagrammatically showing three examples of the editing.

FIG. 19A shows a fillet. This fillet is the editing for forming a circular arc smoothly connecting two elements (line segments). Specifically, it is processing for reforming the angular part at the left side of the graphic to a circular arc to smooth the same.

FIG. 19B shows a chamfer. This chamfer is the editing for forming a gradient connecting two straight lines. Specifically, it is processing for cutting away the angular part at the left of the graphic.

FIG. 19C shows trimming. This trimming is the editing for cutting or extending the elements by elements or points. Specifically, in the left column, it is processing for deleting (cutting) a part intersecting the straight line and projecting to the right in the left figure to give the right figure or, in the right column, for extending to the right the line not reaching the straight line in the left figure to give the right figure.

FIGS. 20A to 20K are views diagrammatically showing 11 types of examples of the geometric constraints.

FIG. 20A shows a HORIZONTAL constraint. This "HORIZONTAL" constraint is a geometric constraint stipulating the line extend in the horizontal direction as shown in the figure.

FIG. 20B shows a VERTICAL constraint. This "VERTICAL" constraint is a geometric constraint stipulating the line extend in the vertical direction as shown in the figure.

FIG. 20C shows a PARALLEL constraint. This "PARALLEL" constraint is a geometric constraint stipulating that two straight lines be parallel to each other as shown in the figure.

FIG. 20D shows an ORTHOGONAL constraint. This "ORTHOGONAL" constraint is a geometric constraint stipulating that two straight lines be at right angles relative to each other as shown in the figure.

FIG. 20E shows TANGENT constraint. This "TANGENT" constraint is a geometric constraint that stipulates that the tangential directions be the same at different edge points as shown in the figure. Here, the black circles in the figure show these points.

FIG. 20F shows a SAME LENGTH constraint. This "SAME LENGTH" constraint is a geometric constraint that stipulates that the lengths of two straight lines be the same as each other as shown in the figure.

FIG. 20G shows a SAME ANGLE constraint. This "SAME ANGLE" constraint is a geometric constraint that stipulates that two angles be the same as each other as shown in the figure.

FIG. 20H shows a SAME VERTICAL COORDINATE constraint. This "SAME VERTICAL COORDINATE" constraint is a geometric constraint that stipulates that the coordinates of two points in the vertical direction be the same as each other as shown in the figure. Here, the black circles in the figure show these points.

FIG. 20I shows a SAME HORIZONTAL COORDINATE constraint. This "SAME HORIZONTAL COORDINATE" constraint is a geometric constraint that stipulates that the coordinates of two points in the horizontal direction bee the same as each other as shown in the figure. Here, the black circles in the figure show these points.

FIG. 20J shows a SAME CENTER constraint. This "SAME CENTER" constraint is a geometric constraint that stipulates that the centers of two circular arcs be the same as each other as shown in the figure.

FIG. 20K shows a CONNECTION constraint. This "CONNECTION" constraint is a geometric constraint that stipulates that two elements be connected as shown in the figure. Here, the black circle in the figure shows the connection point.

FIGS. 21A to 21G are views diagrammatically showing seven examples of the dimensional constraints.

Figure 21A:
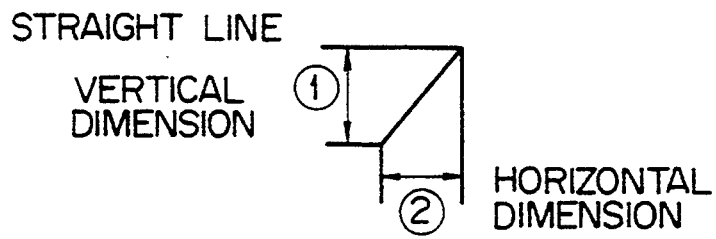
FIGS. 21A to 21G are views diagrammatically showing seven examples of a dimensional constraint.

FIG. 21A shows a STRAIGHT LINE DIMENSION constraint. This "STRAIGHT LINE DIMENSION" constraint includes a <1> vertical dimension and a <2> horizontal dimension constraint and is a dimensional constraint as shown in the figure.

Figure 21B:
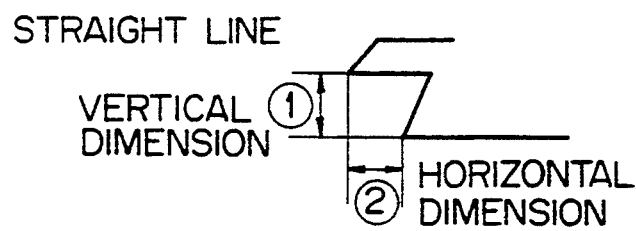

FIG. 21B shows another STRAIGHT LINE DIMENSION constraint. This "STRAIGHT LINE DIMENSION" constraint includes a <1> vertical dimension and a <2> horizontal dimension constraint and is a dimensional constraint as shown in the figure.

Figure 21C:
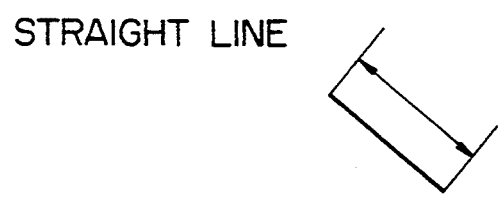

FIG. 21C shows still another STRAIGHT LINE DIMENSION constraint. This "STRAIGHT LINE DIMENSION" constraint is a dimensional constraint of two parallel straight lines as shown in the figure.

Figure 21D:
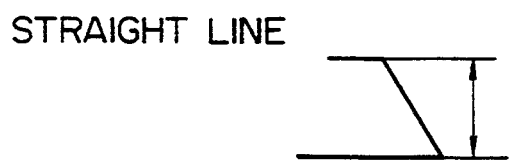

FIG. 21D shows still another STRAIGHT LINE DIMENSION constraint. This "STRAIGHT LINE DIMENSION" constraint is a dimensional constraint as shown in the figure of the distance of the straight line of the normal line and points.

Figure 21E:

FIG. 21E shows an ANGLE DIMENSION constraint. This "ANGLE DIMENSION" constraint is a dimensional constraint between two straight lines as shown in the figure.

Figure 21F:

FIG. 21F shows another ANGLE DIMENSION constraint. This "ANGLE DIMENSION" constraint is a dimensional constraint of a circular arc as shown in the figure.

Figure 21G:
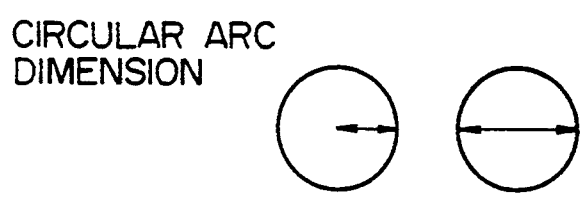

FIG. 21G shows a CIRCULAR ARC DIMENSION constraint. This "CIRCULAR ARC DIMENSION" constraint is a dimensional constraint of the radius and diameter as shown in the figure.

With respect to the geometric constraints and dimensional constraints as above, as already mentioned, the succession and deletion of data in table 8 are carried out when the graphic elements are edited.

As explained above, according to the present invention, there is adopted a construction wherein the succession judgment conditions are preliminarily set in the dimension-geometry constraint succession judging table 41, the dimension-geometry constraint succession judging table 41 is referred to for the dimensional and geometric constraints read out from the dimension-geometry constraint managing table 8 corresponding to the editing of the graphic, they are retained as they are when the judgment is for succession, while they are deleted from the dimension-geometry constraint managing table 8 when the judgment is for deletion, and therefore the succession and deletion of the geometric constraints can be automatically carried out. By this, when a user edits a graphic for which the dimensional and geometric constraints have been defined, the succession and deletion of the dimensional and geometric constraints are automatically carried out, and thus the load on the user in reconstructing these dimensional and geometric constraints can be reduced.

I claim:

1. A graphic processing system for automatically reconstructing dimensional and geometric constraints of a graphic comprising:

a dimension-geometry constraint succession judging table which is referred to for judging whether or not the dimensional and geometric constraints of the graphic are to be succeeded;

a graphic element managing table for storing graphic information for graphic elements constituting the graphic in a one-to-one correspondence with element identifications (ID);

a dimension-geometry constraint managing table for storing the dimensional and geometric constraints for the graphic elements stored in said graphic element managing table; and a constraint reconstructing means for updating, where editing is further applied to a certain graphic and a part of the graphic elements constituting said graphic is changed by said editing, the graphic information of said changed graphic elements in the graphic element managing table; for reading out the dimensional and geometric constraints given with respect to said changed graphic elements from the dimension-geometry constraint managing table; and for referring to the dimension-geometry constraint succession judging table for said read out dimensional and geometric constraints so as to either (i) retain the dimensional and geometric constraints when the related dimensional and geometric constraints should be succeeded in the dimension-geometry constraint managing table or (ii) delete said dimensional and geometric constraints when related dimensional and geometric constraints should be deleted from the dimension-geometry constraint managing table.

2. A graphic processing system as set forth in claim 1, wherein in correspondence with each of various types of editing processes, judgement conditions of whether each of various types of dimensional and geometric constraints can be succeeded after that editing is applied or must be deleted are set in advance and are registered in the dimension-geometry constraint succession judging table.

3. A graphic processing system as set forth in claim 1, wherein the graphic element managing table stores graphic information in correspondence with the element ID's for the graphic elements constituting the graphic.

4. A graphic processing system as set forth in claim 1, wherein the dimension-geometry constraint managing table stores the element ID's of the graphic elements corresponding to dimensional and geometric constraint ID's.

5. A graphic processing system as set forth in claim 2, wherein dimensional constraints include at least one dimensional constraint selected from among "STRAIGHT LINE DIMENSION", "ANGLE DIMENSION", and "CIRCULAR ARC DIMENSION".

6. A graphic processing system as set forth in claim 2, wherein geometric constraints include at least one geometric constraint selected from among "HORIZONTAL", "VERTICAL", "PARALLEL", "ORTHOGONAL", "TANGENT", "SAME LENGTH", "SAME ANGLE", "SAME VERTICAL COORDINATE", "SAME HORIZONTAL COORDINATE", "SAME CENTER", and "CONNECTION".

7. A graphic processing system as set forth in claim 2, wherein the editing includes at least one type of editing selected from among "FILLET", "CHAMFER", and "TRIMMING".

8. A graphic processing system as set forth in claim 1, wherein when an edge point of the graphic element is changed by the editing, the judgment conditions of the dimension-geometry constraint succession judging table display the judgment that the corresponding constraint in the dimension-geometry constraint managing table must be deleted.

9. A graphic processing system as set forth in claim 1, wherein when no change occurs in an edge point of the graphic element even if editing is applied, the judgment conditions of the dimension-geometry constraint succession judging table display the judgment that the corresponding constraint in the dimension-geometry constraint managing table should be succeeded as it is.

10. A graphic processing system as set forth in claim 1, wherein when the graphic element is deleted by the editing, the judgment conditions of the dimension-geometry constraint succession judging table display the judgment that the corresponding constraint in the dimension-geometry constraint managing table must be deleted.

11. A graphic processing system as set forth in claim 1, the graphic processing system providing a parametric function to automatically change a graphic, when a dimensional value is changed, by utilizing the dimensional-geometry constraint managing table according to said change.

12. A graphic processing system as set forth in claim 2, wherein said constraint reconstructing means is formed by an analysis unit which determines which editing and constraint reconstructing processing is to be carried out by analyzing a command input from an input unit.

* * * * *

UNITED STATES PATENT AND TRADEMARK OFFICE
CERTIFICATE OF CORRECTION

PATENT NO. : 5,390,294
DATED : February 14, 1995
INVENTOR(S) : Takeuchi

It is certified that error appears in the above-indentified patent and that said Letters Patent is hereby corrected as shown below:

Column 7, line 52, delete "A" and insert --Δ--.

Column 13, line 8, after " information" insert --<2>--.

Signed and Sealed this

Thirty-first Day of October 1995

Attest:

BRUCE LEHMAN

*Attesting Officer*    *Commissioner of Patents and Trademarks*